United States Patent
Kato (10) Patent No.: US 7,231,266 B2
(45) Date of Patent: Jun. 12, 2007

(54) DIGITAL CONTROL DEVICE AND PROGRAM

(76) Inventor: Toshiji Kato, 39, Daishinin-chou, Shinmachidoori Teranouchi agaru 3choume, Kamigyouku, Kyoto-shi (JP) 602-0000

( * ) Notice: Subject to any disclaimer, the term of this patent is extended or adjusted under 35 U.S.C. 154(b) by 260 days.

(21) Appl. No.: 10/499,917

(22) PCT Filed: Mar. 5, 2003

(86) PCT No.: PCT/JP03/02599

§ 371 (c)(1),
(2), (4) Date: Sep. 8, 2004

(87) PCT Pub. No.: WO03/077046

PCT Pub. Date: Sep. 18, 2003

(65) Prior Publication Data

US 2005/0228514 A1  Oct. 13, 2005

(30) Foreign Application Priority Data

Mar. 13, 2002 (JP) .............................. 2002-067758

(51) Int. Cl.
*G05B 13/02* (2006.01)
*G05B 21/02* (2006.01)
*H03K 5/01* (2006.01)
*H03B 19/00* (2006.01)
*H04B 1/00* (2006.01)

(52) U.S. Cl. ............................ 700/45; 700/37; 700/44; 700/46; 700/74; 204/229.2; 204/229.3; 204/229.4; 327/100; 327/105; 327/113; 327/129; 375/322; 455/42; 455/43

(58) Field of Classification Search ................ 700/28, 700/20, 19, 37, 44, 45, 46, 73, 74; 455/42–43; 398/187–189, 195–196; 327/100, 105, 113, 327/129; 375/322; 204/229.2, 229.3, 229.4
See application file for complete search history.

(56) References Cited

U.S. PATENT DOCUMENTS 4,430,627 A * 2/1984 Machida .................... 331/109

(Continued)

FOREIGN PATENT DOCUMENTS

JP        WO 9016020    * 12/1990

(Continued)

OTHER PUBLICATIONS

Periodic Steady State Analysis of an Autonomous Power Electronic System by a Modified Shooting Method, Kato, Toshiji et al., pp. 522-527, IEEE Transactions of Power electronics, vol. 13, May 1998.*

(Continued)

*Primary Examiner*—Ramesh Patel
(74) *Attorney, Agent, or Firm*—Day Pitney LLP (57) ABSTRACT

A digital control device for tracking a sine wave according to the present invention has a compensator, a control object and a feedback gain. An input into the compensator is a signal obtained by subtracting a control quantity from a reference value. An input into the control object is a signal obtained by subtracting an output of the feedback gain from an output of the compensator. A transfer function of the compensator is $(k_2 z + k_1)/(z^2 - 2z \cos \omega T + 1)$, where $\omega$ is an angular frequency, $T$ is a sampling period, $z$ is a $z$ operator, and $k_1$ and $k_2$ are constants. Thus, a second-order compensator can be configured, with which a sinusoidal reference waveform can be tracked simply and with high accuracy.

8 Claims, 6 Drawing Sheets

U.S. PATENT DOCUMENTS

| | | | |
|---|---|---|---|
| RE34,663 E * | 7/1994 | Seale | 600/587 |
| 5,680,271 A * | 10/1997 | Yatsu | 360/78.09 |
| 5,854,877 A * | 12/1998 | Lewis | 388/812 |
| 5,970,033 A * | 10/1999 | Nakano et al. | 369/44.29 |
| 6,442,111 B1 * | 8/2002 | Takahashi et al. | 369/44.28 |
| 6,587,521 B1 * | 7/2003 | Matui | 375/341 |
| 6,590,945 B1 * | 7/2003 | Brardjanian et al. | 375/340 |
| 6,758,102 B2 * | 7/2004 | Henry et al. | 73/861.356 |
| 6,917,124 B2 * | 7/2005 | Shetler et al. | 307/66 |
| 2003/0137652 A1 * | 7/2003 | Mori | 356/73.1 |
| 2004/0021489 A1 * | 2/2004 | Okui | 327/141 |

FOREIGN PATENT DOCUMENTS

| | | |
|---|---|---|
| JP | 9-82050 | 3/1997 |
| JP | 2000-172341 | 6/2000 |

OTHER PUBLICATIONS

Sinusodial Waveform Following Method for Optimum Digital Control of PWM Inverter, Kato, Toshiji et al., IEEE, vol. 3, pp. 1597-1602, 2004.*

Sinusoidal Wavefor Compensator for Optimal Digital Control of Three-Phase PWM Inverter, KAto, Toshiji et al., pp. 1-10, IEEE, 2005.*

Shoji Fukuda, A Novel Current-Tracking Method for Active Filters Based on a Sinusoidal Internal Model, IEEE Transactions on Industry Applications, vol. 37, No. 3, May/Jun. 2001.

Atsuo Kawamura & Tomoki Yokoyama, Comparison of Five Different Approaches for Rent Time Digital Feedback Control of PWM Inverters, IEEE (date unknown).

* cited by examiner

DIGITAL CONTROL DEVICE AND PROGRAM

TECHNICAL FIELD

The present invention is related to a sine-wave tracking digital control device for controlling the power factor of a sine-wave PWM inverter or converter, for example.

BACKGROUND ART

The output voltage waveform of voltage inverters for vector control of AC electric motors by large power voltage inverters is not a sine wave but a PWM modulated rectangular wave. Consequently, there is the problem of waveform distortion due to higher harmonics.

Figure 5:
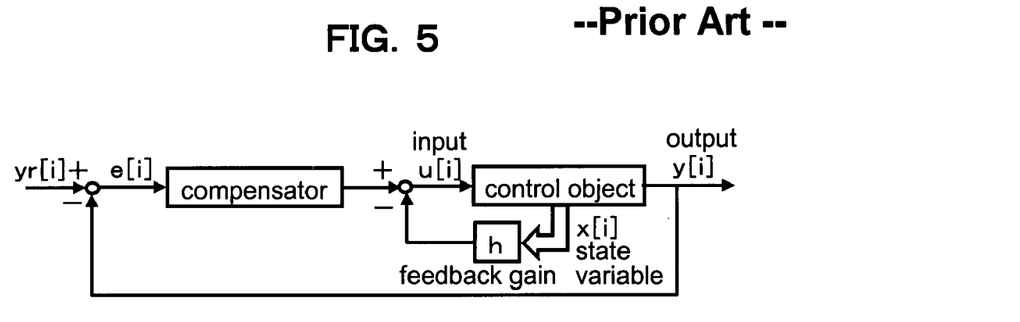
FIG. 5 is a block diagram showing the configuration of a control device according to the prior art.

To address this problem, various devices for digitally controlling sine wave tracking have been proposed. FIG. 5 is a diagram showing the system configuration of such a digital control device for sine wave tracking. This digital control device is configured by a compensator, a control object, and a feedback gain (h). The compensator is provided for controlling the tracking of the output $y[i]$ of the control object to a reference waveform $y_r[i]$.

Figure 6:
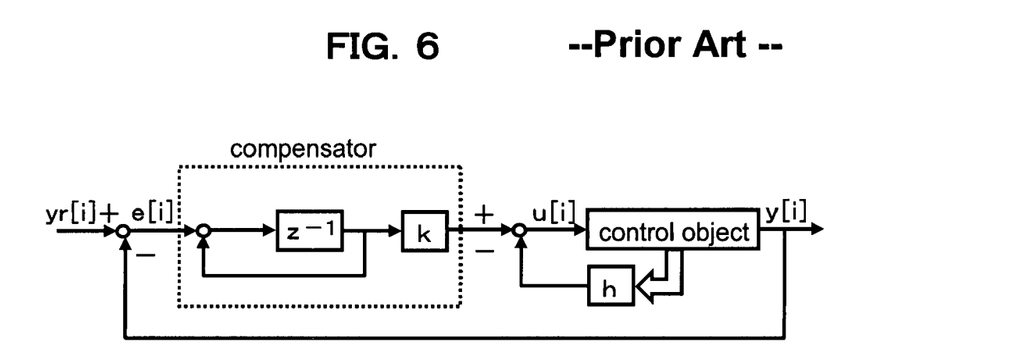
FIG. 6 is a block diagram showing the configuration of a control device according to the prior art.
Figure 7:
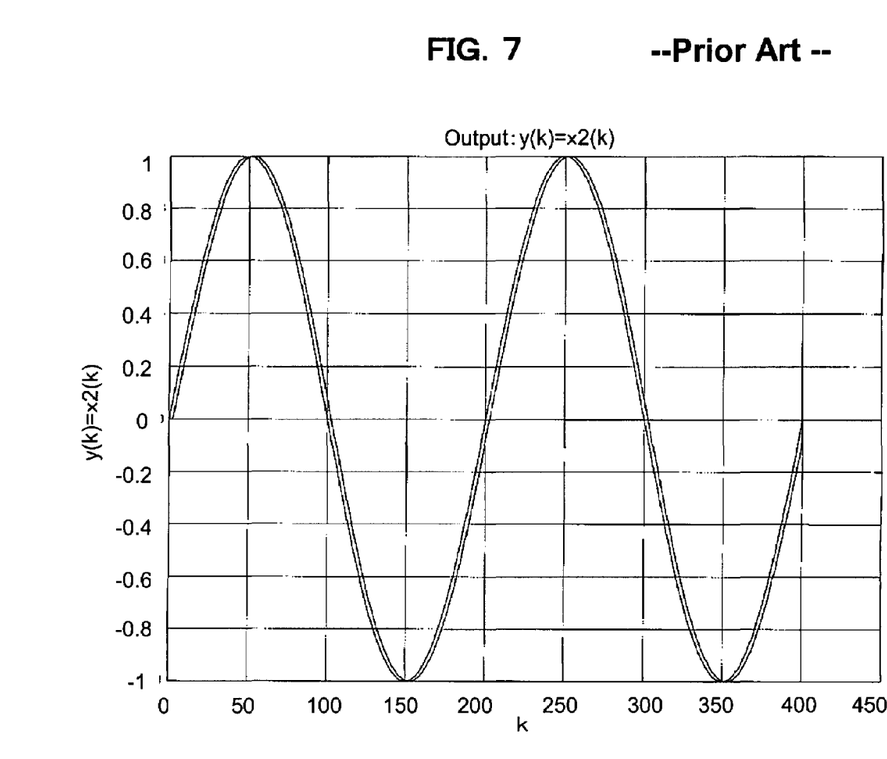
FIG. 7 is a graph illustrating the tracking of a sine wave according to the prior art.
Figure 8:
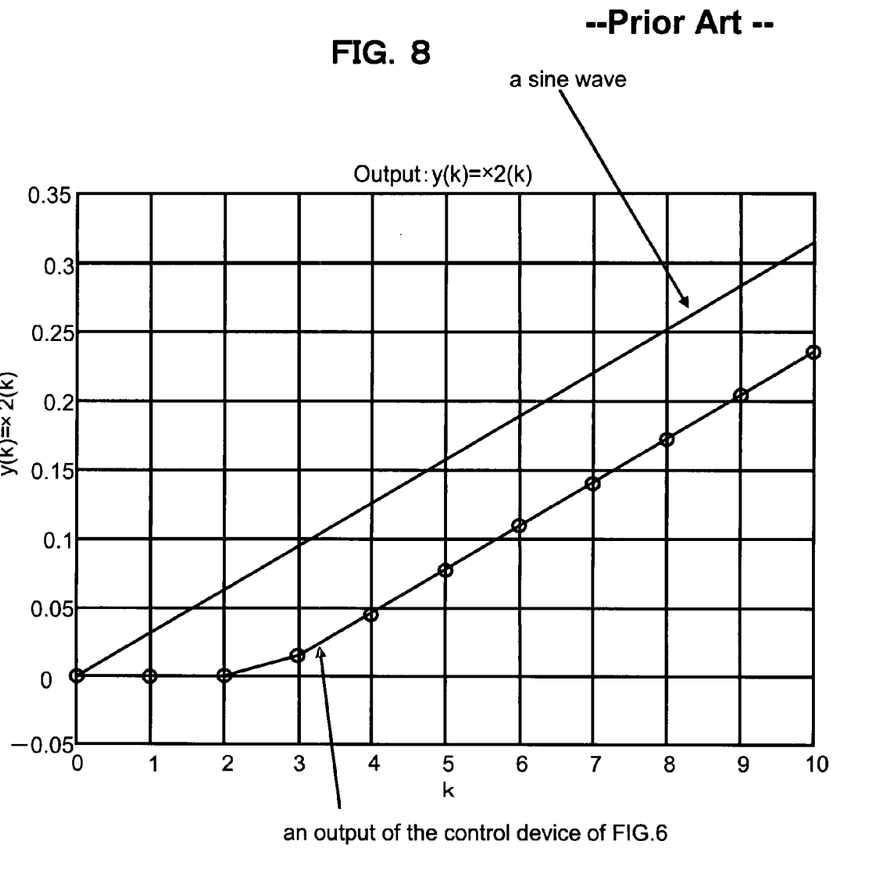
FIG. 8 is a magnification of the graph illustrating the tracking of a sine wave according to the prior art.

Ordinarily, an integrator as shown in FIG. 6 is often used for the compensator in FIG. 5. However, even when performing compensation with this integrator, sine-wave tracking control is not possible, and deviations occur. With the control device in FIG. 6, when determining the gain by deadbeat control for a second-order control object, and trying to track a sine wave, a result as shown in FIG. 7 is obtained. The width between the two curves in FIG. 7 shows the deviation between the sinusoidal reference waveform and the control result with the control device in FIG. 6. FIG. 8 shows a graph in which the sample points of the initial portion 11 in FIG. 7 have been enlarged. As becomes clear from FIG. 8, a deviation occurs with the control device of FIG. 6.

Figure 9:
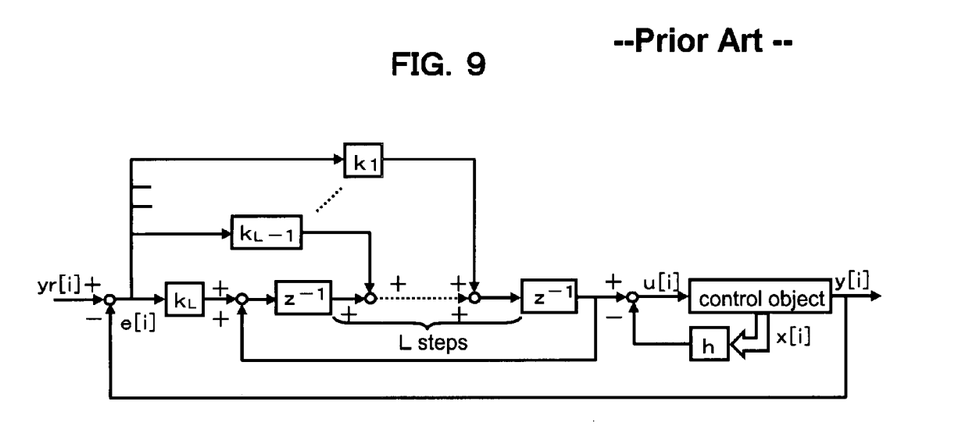
FIG. 9 is a block diagram showing the configuration of a control device according to the prior art.

On the other hand, there are also configurations provided with a compensator due to repetitive control as shown in FIG. 9, based on the internal principle model. However, with a compensator using this repetitive control, a configuration becomes necessary whose order corresponds to one cycle. Therefore, in order to control a 50 Hz sine wave with a sample time of 100 μS (microseconds), a compensator of the $200^{th}$ order becomes necessary. It should be noted that the "200" of the "$200^{th}$ order" is calculated by "(1/50)/0.0001)." An explanation of repetitive control is given for example in "KISO DIGITAL SEIGYO (Basic Digital Control)," Corona Publishing, p. 108.

DISCLOSURE OF THE INVENTION

A digital control device for tracking a sine wave according to the present invention has a compensator, a control object and a feedback gain, wherein an input into the compensator is a signal obtained by subtracting a control quantity from a reference value, wherein an input into the control object is a signal obtained by subtracting an output of the feedback gain from an output of the compensator, and a transfer function of the compensator is $(k_2 z + k_1)/(z^2 - 2z \cos \omega T + 1)$, where $\omega$ is an angular frequency, T is a sampling period, z is a z operator, and $k_1$ and $k_2$ are constants. Thus, a second-order compensator can be configured, with which a sinusoidal reference waveform can be tracked simply and with high accuracy.

BEST MODE FOR CARRYING OUT THE INVENTION

Figure 1:
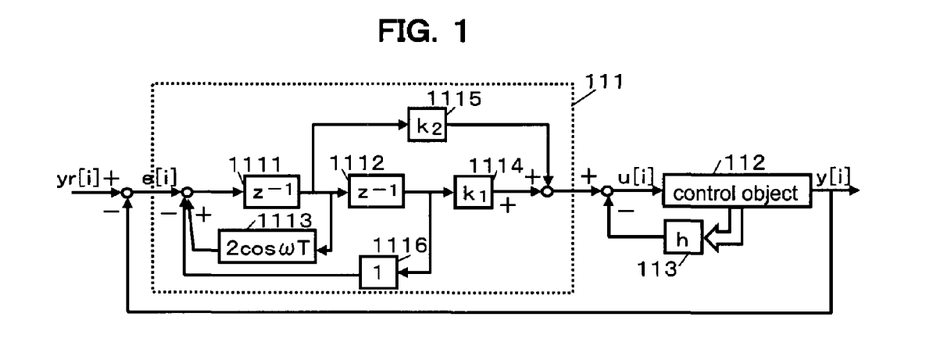
FIG. 1 is a block diagram showing the configuration of a control device according to a preferred embodiment.

The following is an explanation of an embodiment, with reference to the accompanying drawings. FIG. 1 is a block diagram showing the configuration of a control device according to the present invention.

This control device 11 is a sine-wave tracking digital control device having a compensator 111, a control object 112 and a feedback gain 113.

Let $y_r[i]$ be the reference value and $y[i]$ be the output of this digital control device. In this case, the input into the compensator 111 is the value obtained by subtracting the output $y[i]$ from the reference value $y_r[i]$. The input into the control object 112 is the value obtained by subtracting the output of the feedback gain 113 from the output of the compensator 111. The input into the feedback gain 113 is a state variable $x[i]$ from the control object 112.

The specific configuration of the compensator 111 is as follows: The compensator 111 has a first delay element 1111, a second delay element 1112, a first multiplier 1113, a second multiplier 1114, and a third multiplier 1115.

Here, the first delay element 1111 and the second delay element 1112 delay an input by one sample period T. The first multiplier 1113 multiplies an input by $2 \cos \omega T$. $2 \cos \omega T$ means "$2 \times (\cos(\omega T))$." It should be noted that $\omega$ is the angular frequency, and T is the sampling period. The second multiplier 1114 multiplies an input by $k_1$. $k_1$ is a constant. The third multiplier 1115 multiplies an input by $k_2$. $k_2$ is a constant.

The input into the first delay element 1111 is the value obtained by adding the output of the first multiplier 113 to the value ($e[i]$) obtained by subtracting the control quantity ($y[i]$) from the reference value ($y_r[i]$) of the control object, and subtracting therefrom the output of the second delay element 1112. The input into the second delay element 1112, the first multiplier 1113 and the third multiplier 1115 is the output value of the first delay element 1111. The input into the second multiplier 1114 is the output value of the second delay element 1112. Moreover, the output of the compensator 111 is a value obtained by adding the output of the second multiplier 1114 to the output of the third multiplier 1115.

The constants $k_1$ and $k_2$ are determined based on the control object. The constants $k_1$ and $k_2$ can be determined using deadbeat control or optimal control. Deadbeat control and optimal control are well-known techniques, so that their further explanation has been omitted.

Figure 2:
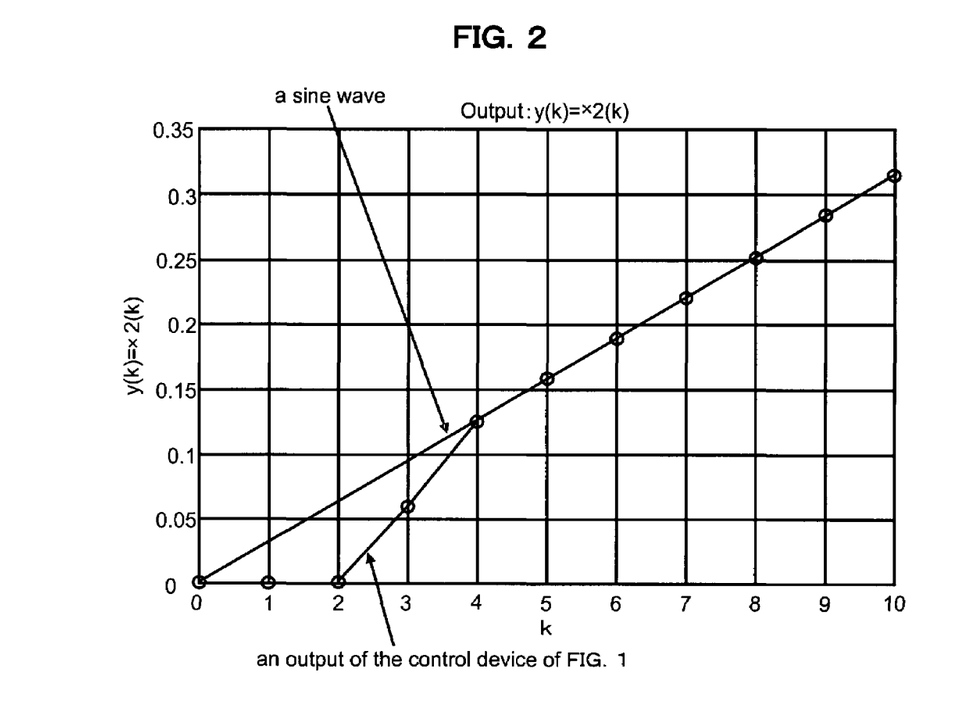
FIG. 2 is a graph illustrating the tracking of a sine wave in a preferred embodiment.

With this control device 11, a control tracking a sine wave as shown in FIG. 2 becomes possible. That is to say, FIG. 2 is graph corresponding to FIG. 8. According to FIG. 2, the deviation to the sine wave becomes zero at the fourth sample point of the initial portion 11.

With the present embodiment as described above, it is possible to control the tracking of a sinusoidal reference waveform easily, quickly and accurately with a second-order compensator.

It should be noted that in the present embodiment, if the constants ($k_1$ and $k_2$) of the compensator in FIG. 1 have a constant ratio, then the results in the above-noted FIG. 2 can be attained. Moreover, there is no limitation to the specific values of the coefficient "2 cos ωT" of the first multiplier of the compensator and the feedback gain "1" (in FIG. 1, the signal is directly put through), as long as the ratio between them is "2 cos ωT:1."

The effect of the present embodiment is not necessarily attained only by the configuration of the compensator in FIG. 1 as described above. In order to attain the effect of the present embodiment, the transfer function of the compensator should be as given in the following equation. The effect of FIG. 2 is attained if the transfer function of the compensator is as given below.

That is to say, when the angular frequency is ω, the sampling period is T, z is the z operator, and $k_1$ and $k_2$ are constants, then the above-noted effect can be attained if the transfer function of the compensator is $(k_2z+k_1)/(z^2-2z\cos\omega T+1)$. It should be noted that the "2z cos ωT" in this transfer function means "$2\times z\times(\cos(\omega T))$".

Moreover, in the foregoing, applications for the sine-wave tracking digital control device according to the present embodiment have not been mentioned, but the sine-wave tracking digital control device according to the present embodiment can be utilized for control of the power factor of a sine-wave PWM inverter or converter, for example.

Consequently, the method of sine-wave tracking digital control of the present embodiment can be applied to various kinds of electronic appliances. Here, electronic appliances refers to air-conditioners, washing machines, refrigerators, inverter-driven vehicles (such as trains and cars) and the like. That is to say, the method of sine-wave tracking digital control of the present embodiment can be utilized widely for power source control in air-conditioners, washing machines or refrigerators, or in inverter-driven vehicles (such as trains and cars) and the like.

Moreover, if control is performed by combining the method of sine-wave tracking digital control of the present embodiment, then the control for the tracking of a reference wave that is a combination of sine waves becomes possible. That is to say, when the reference wave is realized by a combination of a plurality of sine waves, then a compensator as explained in the present embodiment may be configured for each of those sine waves, and the various compensators may be connected in parallel. The effects noted above can also be attained for other circuit configurations with the same transfer function as in a parallel circuit.

The following is a more specific explanation of an example of a tracking control device for the case that the reference waveform is realized by a combination of a plurality of sine waves. The following describes the case of a three-phase reference waveform, which is "A sin ωt+(A/6)×sin 3ωt". Here, "A" is a constant, "ω" is the angular frequency, and "t" is the time variable. Moreover, "A sin ωt" means "$A\times(\sin(\omega t))$", and "sin 3ωt" means "$\sin(3\omega t)$".

The transfer function of the compensator corresponding to the "A sin ωt" in this reference waveform is $(k_2z+k_1)/(z^2-2z\cos\omega T+1)$, as noted above. The transfer function of the compensator corresponding to the "(A/6)×sin 3ωt" in this reference waveform is $(k_4z+k_3)/(z^2-2z\cos\omega T+1)$. Here, $k_4$ and $k_3$ are constants. Moreover, z is the z operator. "2z cos 3ωT+1" means "$(2z)\times(\cos(3\omega T)+1)$."

Figure 3:
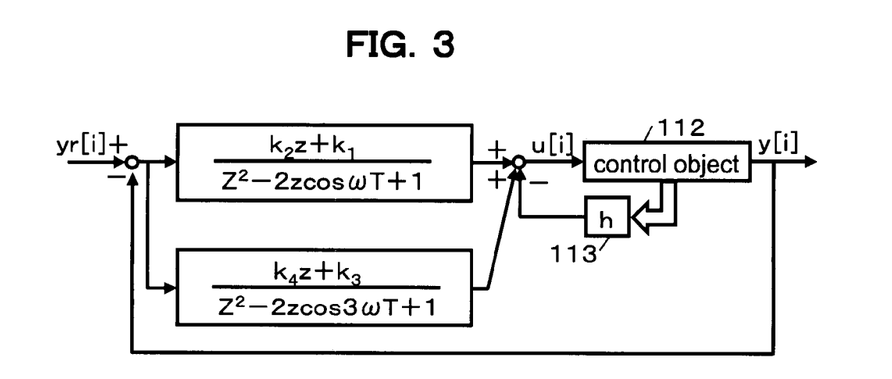
FIG. 3 is a block diagram showing the configuration of a control device according to a preferred embodiment.

FIG. 3 is a block diagram showing the configuration of the control device for this case. As shown in FIG. 3, a compensator having the transfer function "$(k_2z+k_1)/(z^2-2z\cos\omega T+1)$" and a compensator having the transfer function "$(k_4z+k_3)/(z^2-2z\cos 3\omega T+1)$" are connected in parallel.

The following is a generalization of the foregoing: Consider a digital control device tracking a reference waveform that is configured by a combination of n sine waves (where n is an integer of 2 or greater). In this digital control device, n compensators are connected in parallel, the input into the n compensators is the signal obtained by subtracting the control quantity from the reference value, and the input into the control object is the signal obtained by subtracting the output of the feedback gain from the sum of the outputs of the n compensator. When the z operator is z, and $k_1$ and $k_2$ are constants, and when a given sine wave constituting the reference waveform is expressed by "A sin kωt" (where A and k are constants, ω is the angular frequency and t is the time variable), then the transfer function of the compensator corresponding to that sine wave is $(k_2z+k_1)/(z^2-2z\cos k\omega T+1)$. This is visualized in FIG. 4. Here, the "2z cos 2kωT" of the transfer function means "$2\times z\times(\cos(2\times k\times\omega\times T))$". It should be noted that the digital control devices shown in FIG. 3 and FIG. 4 can be utilized for controlling the power factors of sine-wave PWM inverters or converters, for example. Consequently, also the digital control device shown in FIG. 3 and FIG. 4 can be applied to various kinds of electronic appliances. Here, electronic appliances refers to air-conditioners, washing machines, refrigerators, inverter-driven vehicles (such as trains and cars) and the like. That is to say, the digital control device and the digital control method of FIG. 3 and FIG. 4 can be utilized widely for power source control in air-conditioners, washing machines or refrigerators, or in inverter-driven vehicles (such as trains and cars) and the like.

Figure 4:
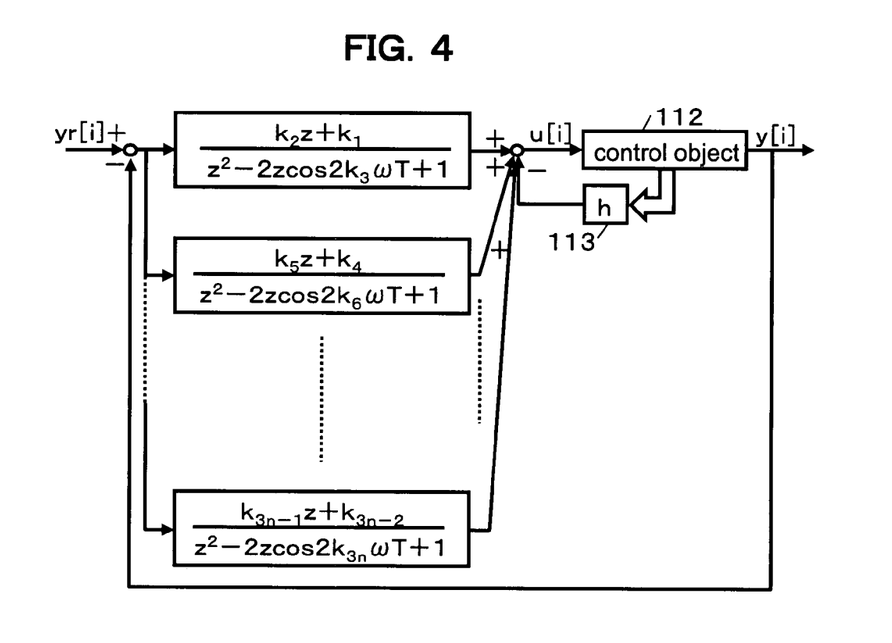
FIG. 4 is a block diagram showing the configuration of a control device according to a preferred embodiment.

In the control device in FIG. 4, n compensators are used. However, one or more compensators are sufficient. That is to say, it is also possible to freely bundle the n compensators in FIG. 4 and to replace them by one or more compensators having an overall equivalent transfer function. In this case, the control device has the following configuration: A digital control device tracking a reference waveform that is made up by combining n sine waves (where n is an integer of 2 or greater), the digital control device having at least one compensator, a control object and a feedback gain, wherein an overall transfer function of the at least one compensator is equivalent to the overall transfer function of the n compensators in FIG. 4.

Moreover, in this embodiment, a digital control device was explained that tracks a reference waveform which is a sine wave or a combination of sine waves. However, the digital control device or the digital control method explained in the present embodiment (the digital control devices and the digital control methods shown in FIG. 1, 3 or 4) can also be applied for the case that the reference waveform is a combination of sine waves and other waveforms (that are not sine waves). That is to say, if the reference waveform is a combination of sine waves and other waveforms, the digital control devices and the digital control methods shown in FIG. 1, 3 or 4 can be used in the tracking control of the portion corresponding to the sine waves. Thus, it is possible to control the tracking of the reference waveform easily and with high accuracy.

Furthermore, it is also possible to realize the operation of the digital control device explained in the present embodiment by software. It is further possible to place this software on a server, for example, and to distribute the software by software downloads. Furthermore, it is also possible to record and distribute the software on a recording medium, such as a CD-ROM. More specifically, such a program may have the following configuration: A program for realizing a digital control device having a compensator, a control object and a feedback gain, which is a program for executing on a computer a digital control method for tracking a sine wave, wherein an input into the compensator is a signal obtained by subtracting a control quantity from a reference value, an input into the control object is a signal obtained by subtracting an output of the feedback gain from an output of the compensator, and a transfer function of the compensator is $(k_2z+k_1)/(z^2-2z \cos \omega T+1)$, where $\omega$ is an angular frequency, T is a sampling period, z is a z operator, and $k_1$ and $k_2$ are constants.

The program may also be configured as follows: A program for realizing a digital control device having n compensators, a control object and a feedback gain, which is a program for executing on a computer a digital control method for tracking a reference wave that is made up by combining n sine waves (where n is an integer of 2 or greater), wherein the n compensators are connected in parallel, an input into the n compensators is a signal obtained by subtracting a control quantity from a reference value, an input into the control object is a signal obtained by subtracting an output of the feedback gain from a sum of the outputs of the n compensators, and when a given sine wave constituting the reference waveform is expressed by "A sin kωt" (where A and k are constants, ω is the angular frequency and t is the time variable), then a transfer function of the compensator corresponding to that sine wave is $(k_2z+k_1)/(z^2-2z \cos k\omega T+1)$, where z is a z operator, and $k_1$ and $k_2$ are constants.

The program may also be configured as follows: A program for realizing a digital control device having at least one compensator, a control object and a feedback gain, which is a program for executing on a computer a digital control method for tracking a reference wave that is made up by combining n sine waves (where n is an integer of 2 or greater), wherein an overall transfer function of the at least one compensator is equivalent to the overall transfer function of the n compensators in FIG. 4.

INDUSTRIAL APPLICABILITY

The present invention is related to a sine-wave tracking digital control device for controlling the power factor of a sine-wave PWM inverter or converter, for example, and can control the tracking of a sinusoidal reference wave easily and with high accuracy, with a second-order compensator.

The invention claimed is:

1. A sinusoidal wave follow-up digital control device for use with PWM inverters for tracking a sine wave, said digital control device comprising a compensator, a control object to be controlled by the sinusoidal wave follow-up digital control device and a feedback gain control,
wherein the compensator is configured to receive as its input a signal obtained by subtracting a control quantity from a reference value;
wherein the control object is configured to receive as its input a signal obtained by subtracting an output of the feedback gain control from an output of the compensator; and
wherein a transfer function of the compensator is $(k_2z+k_1)/(z^2-2z \cos \omega T+12)$, where $\omega$ is an angular frequency, T is a sampling period, z is a z operator, and $k_1$ and $k_2$ are constants, thereby configuring a second-order compensator for providing high accuracy tracking of a sinusoidal reference waveform.

2. The sinusoidal wave follow-up digital control device according to claim 1,
wherein the compensator comprises a first delay element outputting an input at a delay of one sample period T, a second delay element outputting an input at a delay of one sample period T, a first multiplier multiplying an input by 2z cos ωT, a second multiplier multiplying an input by $k_1$, and a third multiplier multiplying an input by $k_2$;
wherein the first delay element is configured to receive as its input a signal obtained by adding an output of the first multiplier to the signal obtained subtracting the control quantity from a reference value of the control object, and subtracting from this added signal the output of the second delay element;
wherein the second delay element, the first multiplier and the third multiplier are configured to receive as their inputs an output from the first delay element;
wherein the second multiplier is configured to receive as its input a signal that is output from the second delay element; and
wherein the compensator outputs a signal that is obtained by adding an output of the second multiplier to an output of the third multiplier.

3. A sinusoidal wave follow-up digital control device for tracking a reference waveform made up by combining n sine waves (where n is an integer of 2 or greater), the digital control device having n compensators, a control object and a feedback gain control;
wherein the n compensators are connected in parallel;
wherein the n compensators is configured to receive as its input a signal obtained by subtracting a control quantity from a reference value;
wherein the control object is configured to receive as its input a signal obtained by subtracting an output of the feedback gain control from a sum of the outputs of the n compensators; and
wherein, when a given sine wave constituting the reference waveform is expressed by "A sin kωt" (where A and k are constants, ω is an angular frequency and t is a time variable), then a transfer function of the compensator corresponding to that sine wave is $(k_2z+k_1)/(z^2-2z \cos k\omega T+1)$, where z is a z operator, and $k_1$ and $k_2$ are constants.

4. A sinusoidal wave follow-up digital control device for tracking a reference waveform made up by combining n sine waves (where n is an integer of 2 or greater), the digital control device having at least one compensator, a control object and a feedback gain control;
wherein an overall transfer function of the at least one compensator is equivalent to the overall transfer function of the n compensators of claim 3.

5. An electronic appliance incorporating the sinusoidal wave follow-up digital control device according to any one of claims 1 to 4.

6. A program product stored on a computer readable medium for realizing a sinusoidal wave follow-up digital control device having a compensator, a control object and a feedback gain control, the program executing on a computer a digital control method for tracking a sine wave;

wherein the compensator is configured to receive as its input a signal obtained by subtracting a control quantity from a reference value;

wherein the control object is configured to receive as its input a signal obtained by subtracting an output of the feedback gain control from an output of the compensator; and wherein a transfer function of the compensator is $(k_2 z + k_1)/(z^2 - 2z \cos \omega T + 1)$, where $\omega$ is an angular frequency, T is a sampling period, z is a z operator, and $k_1$ and $k_2$ are constants.

7. A program product stored on a computer readable medium for realizing a sinusoidal wave follow-up digital control device having n compensators, a control object and a feedback gain control, the program executing on a computer a digital control method for tracking a reference waveform made up by combining n sine waves (where n is an integer of 2 or greater);

wherein the n compensators are connected in parallel;

wherein the n compensators is configured to receive as its input a signal obtained by subtracting a control quantity from a reference value;

wherein the control object is configured to receive as its input a signal obtained by subtracting an output of the feedback gain control from a sum of the outputs of the n compensators; and wherein, when a given sine wave constituting the reference waveform is expressed by "$A \sin k\omega t$" (where A and k are constants, $\omega$ is an angular frequency and t is a time variable), then a transfer function of the compensator corresponding to that sine wave is $(k_2 z + k_1)/(z^2 - 2z \cos \omega T + 1)$, where z is a z operator, and $k_1$ and $k_2$ are constants.

8. A program product stored on a computer readable medium for realizing a sinusoidal wave follow-up digital control device having at least one compensator, a control object and a feedback gain control, the program executing on a computer a digital control method for tracking a reference waveform made up by combining n sine waves (where n is an integer of 2 or greater);

wherein an overall transfer function of the at least one compensator is equivalent to the overall transfer function of the n compensators of claim 7.

* * * * *